(12) United States Patent
Danna et al.

(10) Patent No.: US 8,712,738 B2
(45) Date of Patent: Apr. 29, 2014

(54) DETERMINING ILL CONDITIONING IN SQUARE LINEAR SYSTEM OF EQUATIONS

(75) Inventors: Emilie Jeanne Anne Danna, Sunnyvale, CA (US); Edward Seymour Klotz, Incline Village, NV (US)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 12/772,062

(22) Filed: Apr. 30, 2010

(65) Prior Publication Data

US 2011/0270589 A1    Nov. 3, 2011

(51) Int. Cl.
*G06F 7/60*  (2006.01)

(52) U.S. Cl.
USPC ............................................................ 703/2

(58) Field of Classification Search
USPC .......................................... 703/2; 705/14.52
See application file for complete search history.

(56) References Cited

U.S. PATENT DOCUMENTS

| | | | |
|---|---|---|---|
| 5,101,669 A * | 4/1992 | Holm-Kennedy et al. ........................ | 73/862.626 |
| 5,159,249 A * | 10/1992 | Megherbi .................... | 318/568.1 |
| 5,604,911 A * | 2/1997 | Ushiro .............................. | 703/2 |
| 5,795,997 A * | 8/1998 | Gittins et al. .............. | 73/117.02 |
| 6,477,467 B1 | 11/2002 | Siltton et al. | |
| 6,487,524 B1 | 11/2002 | Preuss | |
| RE39,165 E * | 7/2006 | Bjarnason et al. ............ | 375/222 |
| 7,219,115 B2 | 5/2007 | Selvaraj | |
| 7,330,767 B2 * | 2/2008 | Thiele et al. ..................... | 700/29 |
| 7,418,370 B2 | 8/2008 | Feldmann et al. | |
| 7,418,372 B2 * | 8/2008 | Nishira et al. ..................... | 703/2 |
| 7,489,797 B2 | 2/2009 | Izquierdo | |
| 8,001,032 B2 * | 8/2011 | Markov et al. .............. | 705/36 R |
| 2002/0044628 A1 * | 4/2002 | Hussein et al. .................. | 378/89 |
| 2004/0059763 A1 * | 3/2004 | Selvaraj ........................ | 708/300 |
| 2005/0267608 A1 * | 12/2005 | Nishira et al. .................. | 700/44 |
| 2007/0067167 A1 * | 3/2007 | Barford ........................ | 704/226 |
| 2008/0259074 A1 | 10/2008 | Tian et al. | |
| 2009/0037157 A1 * | 2/2009 | Feldmann et al. ................ | 703/2 |
| 2009/0190807 A1 | 7/2009 | Rousso et al. | |
| 2009/0245441 A1 | 10/2009 | Cairns et al. | |
| 2010/0011039 A1 | 1/2010 | Vannucci | |
| 2010/0063946 A1 | 3/2010 | Al-Duwaish | |
| 2011/0044521 A1 * | 2/2011 | Tewfik et al. ................. | 382/131 |

OTHER PUBLICATIONS

J.H. Won, J. Lim, S. J. Kim, and B. Rajaratnam, "Maximum Likelihood Covariance Estimation with a Condition Number Constraint", Technical Report No. 2009-10, pp. 1-47, Aug. 2009.*
C.S.Kenney, A.J.LAub, and M.S.Reese, "Statistical Condition Estimation for Linear Systems", vol. 19, No. 2, pp. 566-583, Mar. 1998.*
J.H. Won, J. Lim, S. J. Kim, and B. Rajaratnam, "Maximum Likelihood Covariance Estimation with a Condition Number Constraint", Technical Report No. 2009-10, Aug. 2009, pp. 1-47.*
J. W. Demmel, "On Condition Numbers and the Distance to the Nearest Ill-posed Problem" No. Math. 51, 251-289 (1987).*

(Continued)

*Primary Examiner* — Omar Fernandez Rivas
*Assistant Examiner* — Kibrom Gebresilassie
(74) *Attorney, Agent, or Firm* — Sughrue Mion, PLLC

(57) ABSTRACT

Determining ill conditioning in square linear systems of equations is disclosed. Specifically, a method, system and computer program product for determining ill conditioning in square linear systems of equations is disclosed, the method including sampling condition numbers in the square linear systems of equations, and classifying the condition numbers sampled from the square linear systems of equations.

22 Claims, 6 Drawing Sheets

(56) References Cited

OTHER PUBLICATIONS

"ILOG CPLEX 11.0", User's Manual, Sep. 2007, pp. 1-532.*
A. Micchi, G. Pannocchia, "Comparison of input signals in subspace identification of multivariable ill-conditioned systems", Journal of Process Control 18 (2008), pp. 582-593.*
Chapter 04.09 Adequacy of Solutions, pp. 1-11, Mar. 8, 2010.*
P. Misra, M. Nikolaou, "Input Design for model order Determination in Subspace Identification", AICHE Journal, vol. 49, No. 8, Aug. 2003, pp. 2124-2132.*
Condition number—Wikipedia, the free encyclopedia, pp. 1-4, Nov. 29, 2012.*
C.S. Kenney, A. J. Laub, and M. S. Reese, "Statistical condition Estimation for Linear Systems" pp. 566-583, 1998.*
T. Ohta, T. Ogita, S. M. Rump, S. Oishi, "Numerical Verification Method for Dense Linear Systems with Arbitrarily Ill-conditioned Matrices", pp. 745-748, Oct. 18-21, 2005.*
X. Xiao and S. Mao, Research on Ill-conditioned Problem and Modeling Precision in GM(1,1) Model, pp. 1-6, 2005.*
X. Xiao and S. Mao, Research on Ill-conditioned Problem and Modeling Precision in GM(1,1) Model, 2005, pp. 1-6.*
Duff et al.; "Direct Methods for Sparse Matrices", British Library Cataloguing in Publication Data, 1986, pp. 79-81, Oxford University Press, New York.
Higham, Nicholas J.; "Accuracy and Stability of Numerical Algorithms", Society for the Industrial and Applied Mathematics, 1996, pp. 9-10, Library of Congress Cataloging-in-Publication Data, USA.
Golub, Gene H. et al.; "Matrix Computations", Library of Congress Cataloging in Publication Data, 1983, pp. 24-27, John Hopkins University Press, USA.
Gill, P.E., et al.; "Practical Optimization", British Library Cataloguing in Publication Data, 1981, pp. 28-30, Academic Press Inc, Orlando.
Kim et al.; "A New Algorithm for Solving Ill Conditioned Linear Systems", IEEE Transactions on, vol. 32, Iss. 3, May 1996, pp. 1373-1376.
Papadopoulos et al.; "Least-Squares Solution of Ill-Conditioned Lyapunov Equations", American Control Conference, Jun. 2-4, 1993, pp. 1588-1592.
Solo, V.; "Limits to Estimation in Stochastic Ill-Conditioned Inverse Problems", IEEE Transactions on, vol. 46, Iss. 5, Aug. 2000, pp. 1872-1880.
Wang et al.; "Application of Iterative Calculation of Matrix for Solving Ill-Posed Problems", International Symposium on, vol. 1, Oct. 17-18, 2008, pp. 33-36.

* cited by examiner

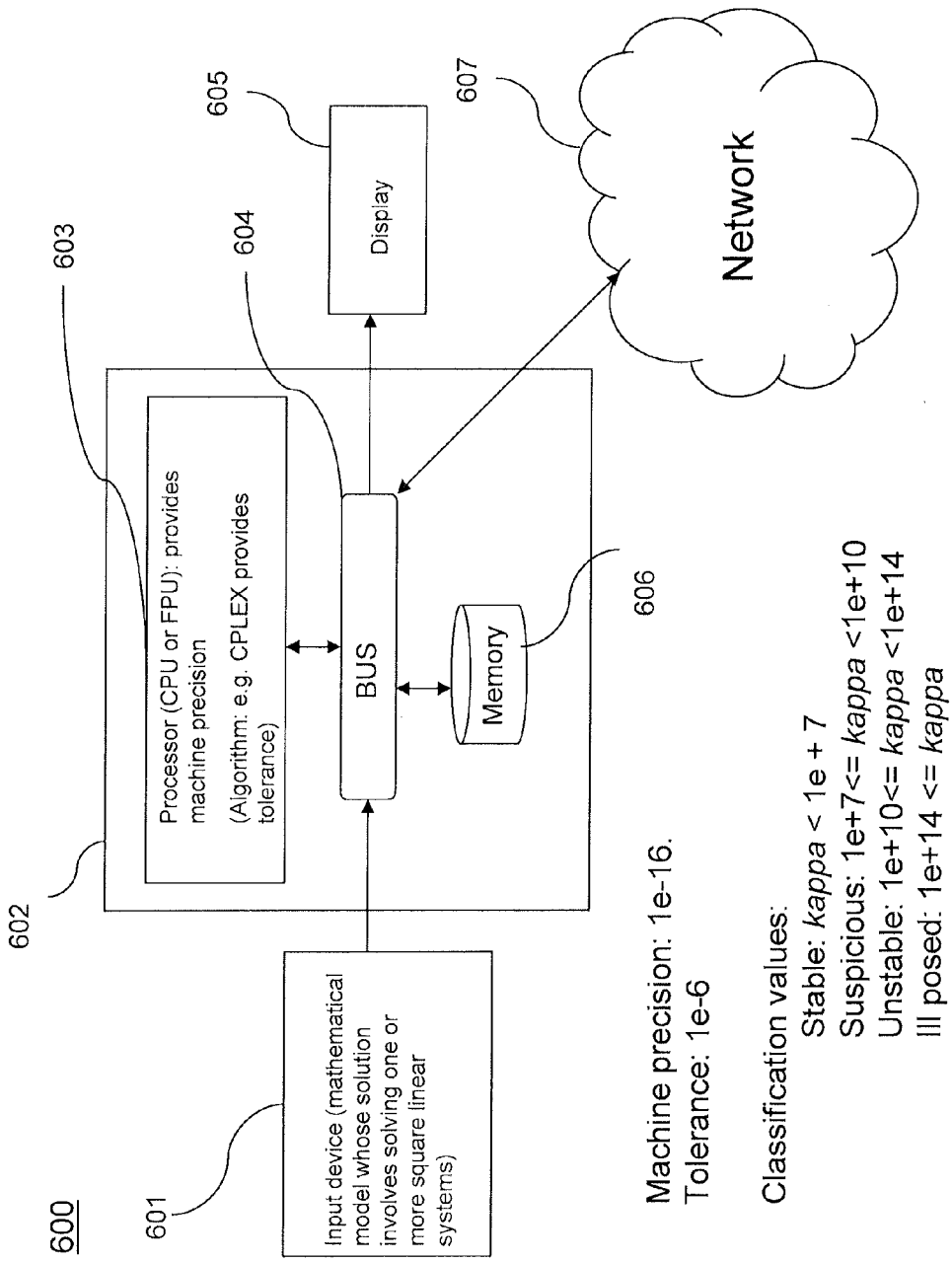

DETERMINING ILL CONDITIONING IN SQUARE LINEAR SYSTEM OF EQUATIONS

BACKGROUND

1. Field

The present disclosure relates to the field of ill conditioning, and specifically, determining whether square linear systems of equations are ill conditioned.

2. Description of Related Art

Analytics systems are often used in business applications. Business Analytics use statistical and quantitative methods on data to perform forward looking analysis. Applying quantitative optimization methods to business analytics problems can enable companies to more effectively handle the complexity and large amounts of data in their operations.

IBM® ILOG® CPLEX®, also known as CPLEX, named for the simplex method in combination with the C programming language, is software from the IBM Corporation. CPLEX can solve mathematical optimization problems arising from business analytics models as well as other scientific computing applications. All of CPLEX's algorithms come from the field of mathematical programming, and they involve computing solutions to square linear systems of equations. CPLEX can solve optimization models in numerous industries, including production planning in manufacturing processes, crew scheduling in the airlines industry, vehicle routing and delivery in the transportation industry, and computational biology in medicine. However, within analytics systems, such as CPLEX, ill conditioning in the square linear systems of equations can occur.

Ill conditioning, which is a concept of scientific computing and numerical linear algebra, is a situation in which a small change in an input value to a mathematical model can result in a large change to the computed solution or output value. For example, square linear systems of equations can be determined to be ill conditioned if a condition number is large, and it can be determined to be well conditioned if the condition number is small. Further, as the value of a condition number increases, the change in the computed solution or output value has the potential to increase relative to the change in input data.

Computers have a limited number of bits to represent numeric values. The typical floating point system used by computers cannot represent all rational numbers exactly, and any system with a finite number of bits cannot represent all real numbers exactly. Therefore, scientific computing applications often cannot exactly represent the mathematical systems they model. In other words, these floating point systems have finite precision.

A computer's machine precision represents the rounding error that can arise from the finite precision in the representation of such numerical values. The condition number of a square matrix corresponding to a linear system of equations provides a multiplicative factor of the change in input value that can manifest itself in the computed solution or output value. Specifically, consider a matrix A with m rows and m columns, and m vectors x and b of variables and data, respectively. For a given change in the input in either A or b, the condition number of A provides a measure of the change in output in the computed solution x of the square linear system Ax=b. The condition number of the matrix A associated with this linear system can be quantitatively derived as $$K(A)=\|A\|*\|A^{-1}\|$$

If a computing application that solves such square linear systems is run on a computer with finite precision, then the machine precision provides a measure of the minimum change in the input. Letting $\Delta$ represent the small change in input to the data of the linear system in A or b, then $K(A)*\Delta$ provides an upper bound on the change to the computed solution x. From this product of $K(A)$ and $\Delta$ we see that larger condition numbers imply larger potential changes in the computed solution. Such large condition numbers can make seemingly irrelevant changes to the input yield much larger changes in the output.

Even if a mathematical model formulator does not change the data, finite precision computers can introduce small changes into square linear systems of equations, which could result in a large change to the computed solutions or output values. For example, if a user moves their program from a machine having a Microsoft Windows® operating system to a machine having an IBM AIX® operating system, the move can change the machine precision enough to significantly influence results if square linear systems of equations are ill conditioned.

However, there currently does not exist any method for quantitatively assessing ill conditioning in a square linear system of equations. The current state of the art does not determine what constitutes a large or a small condition number when assessing the conditioning of a square linear system of equations. Also, there is no known method for addressing ill conditioning in algorithms, such as linear, mixed integer, quadratic, and nonlinear programming algorithms, that solve a series of interrelated square linear systems of equations.

In the current art, many programs do not address the issue of ill conditioning of square linear systems of equations. At most, in the event square linear systems of equations are determined to be ill conditioned, the current art would merely display a single condition number. The user would then have to determine whether the value of the condition number is sufficiently large to make the system ill conditioned. Further, when addressing only a single condition number from a single linear system of equations, the situation in which a sequence of condition numbers are generated, is not addressed. In some instances, examining a single condition number would give a partial view of ill conditioning for a particular problem.

SUMMARY

According to an embodiment, a method, system and computer program product are provided by sampling condition numbers in the square linear systems of equations and classifying the condition numbers sampled from the square linear systems of equations.

In another embodiment, a method for determining ill conditioning in a plurality of linear systems of equations is provided and the method includes sampling a predetermined amount of condition numbers in the plurality of the square linear systems of equations; classifying the condition numbers sampled from the plurality of square linear systems of equations according to a level of categorization; generating statistical information on the plurality of square linear systems of equations according to the level of categorization; and assessing a likelihood of ill conditioning according to the generated statistics.

Another embodiment is a method for determining ill conditioning in a square linear system of equations, the method including obtaining a condition number of the square linear system of equations; and assessing whether the square linear system is ill conditioned according to a level of categorization of the condition number.

BRIEF DESCRIPTION OF DRAWINGS

Certain aspects of the present invention will become more apparent by describing in detail illustrative, non-limiting embodiments thereof with reference to the accompanying drawings, in which like reference numerals refer to like elements in the drawings, in which:

FIG. 6 is a diagram illustrating classification information of a program according to an embodiment.

DETAILED DESCRIPTION

Figure 1:
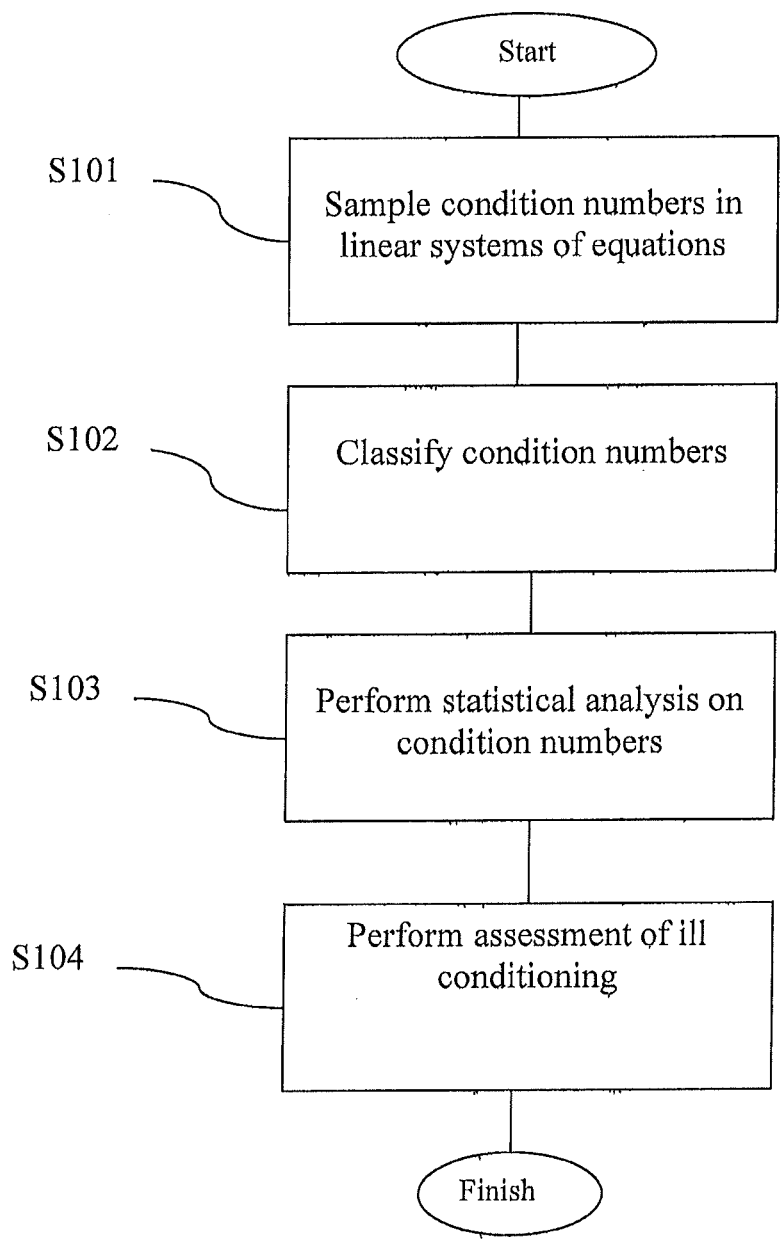
FIG. 1 is a flowchart generally describing the method of determining whether square linear systems of equations are ill conditioned according to an embodiment.

Various embodiments are described in detail with reference to the accompanying drawings. The embodiments may be embodied in various forms without being limited to the embodiments set forth herein. Descriptions of well known parts are omitted for clarity, and like reference numerals refer to like elements throughout.

Various embodiments of the invention are directed to determining whether square linear systems of equations are ill conditioned and if so, the level of ill conditioning.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
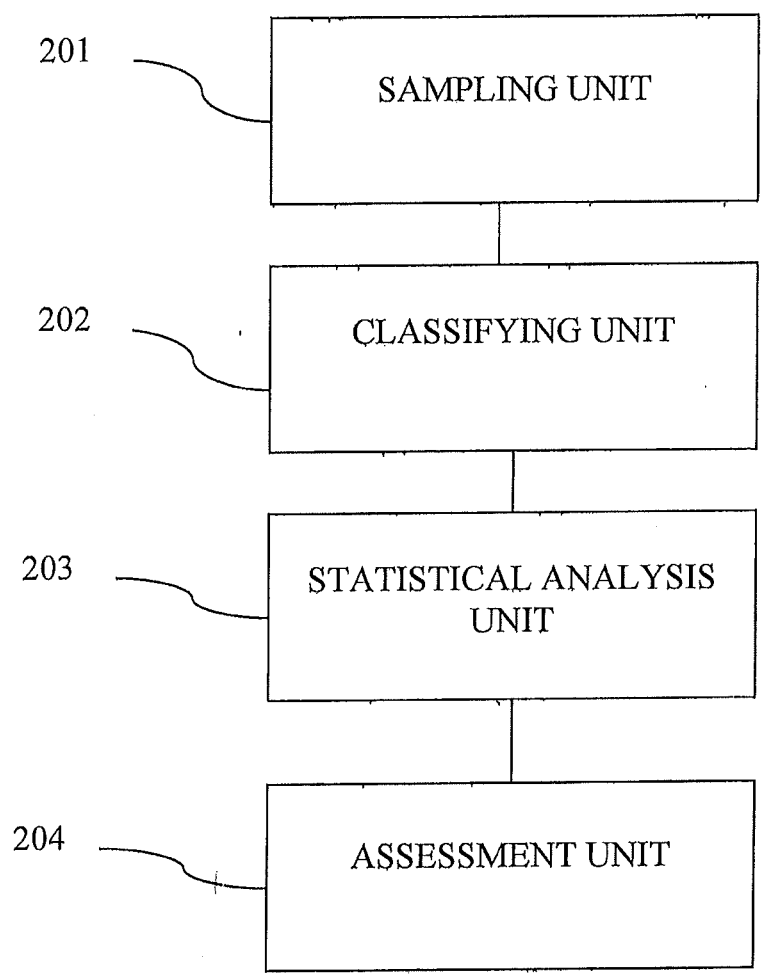
FIG. 2 is a diagram illustrating a system for implementing the method of FIG. 1.

FIG. 1 is a flowchart generally describing the method of determining whether square linear systems of equations are ill conditioned according to an embodiment. FIG. 2 is a diagram illustrating a system for implementing the method of FIG. 1.

In step 101, sampling of condition numbers in square linear systems of equations is performed by sampling unit 201. In step 102, the sampled numbers are classified by classifying unit 202. In step 103, statistical analysis is performed on the classified numbers by statistical analysis unit 203 and in step 104, assessment is performed on the condition numbers to determine ill conditioning by assessment unit 204.

Figure 3:
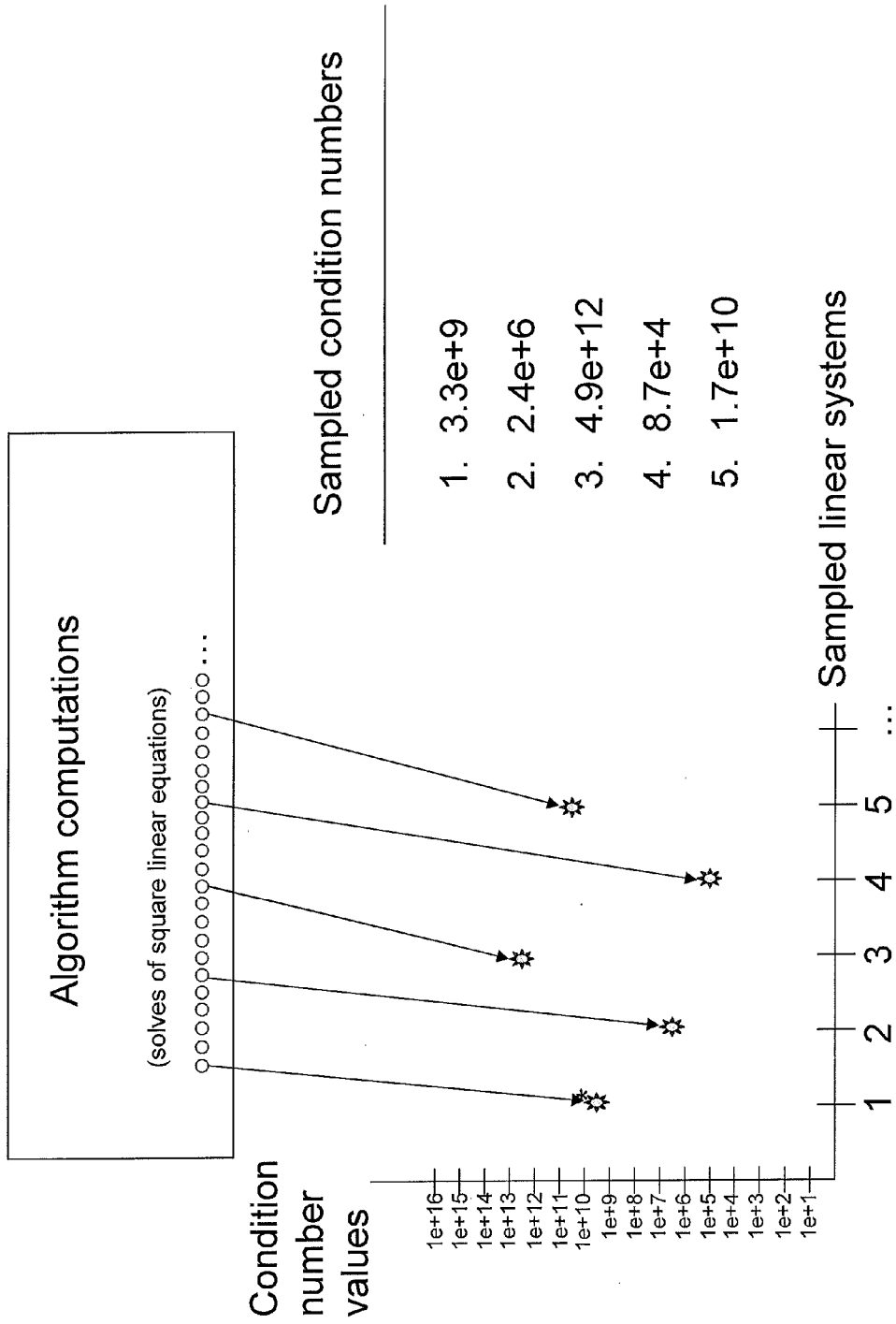
FIG. 3 is a diagram illustrates sampling condition numbers according to an embodiment.

FIG. 3 is a diagram illustrating sampling condition numbers according to an embodiment. In step 101 of FIG. 1, sampling of condition numbers is performed. Specifically, a history of the overall ill conditioning profile is built by sampling condition numbers. Since different condition numbers in different square linear systems of equations are obtained, a more complete view of the ill conditioning profile of a model being solved is obtained.

As illustrated in FIG. 3, the sampling can be performed to obtain a condition number from each linear system of equations in a program. The sampling can be performed based on a predefined numeric value, for example, sample every $10^{th}$ condition number, based on a feature of the algorithm, for example, the linear system associated with an optimal basic solution of each node relaxation linear program, or based on any amount of sampling desired by a user.

As illustrated in FIG. 3, the sampling is performed according for every $5^{th}$ observed condition number, although the sampling is not limited thereto. Further, through sampling, the user can assess ill conditioning without computing all of the conditions numbers associated with the linear systems of equations in a sequence associated with an application.

Although a user could sample every condition number in a sequence of systems of linear equations, in order to decrease cost, sampling can be performed less frequently. Also, the condition number can be estimated instead of performing an exact computation of the condition number. However, a sufficient amount of sampling should be performed to ensure that the distribution of the sample condition numbers is close to that of the distribution of all condition numbers associated with linear systems in the sequence. Therefore, a more accurate detection of the level of ill conditioning can be obtained.

Referring to FIG. 1, after sampling the condition numbers in step 101, the condition numbers are classified in step 102. The classification depends on the computer and the application that solves the square linear systems of equations. For example, the classification could depend on the Central Processing Unit (CPU) or Floating Point Unit (FPU), which defines the machine precision value that is essential to the classification.

Figure 4:
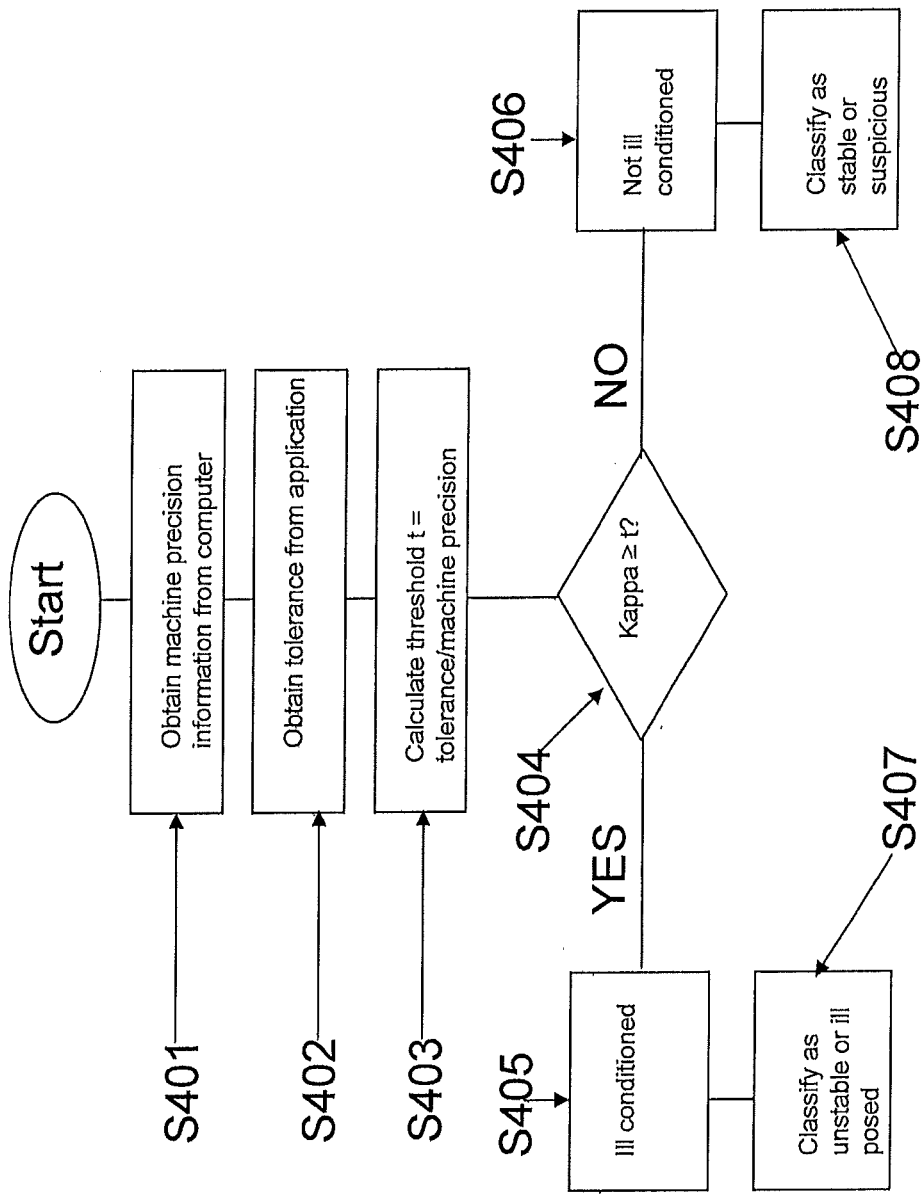
FIG. 4 is a flowchart illustrating the classifying of condition numbers, according to an embodiment.

FIG. 4 is a flowchart illustrating the classifying of condition numbers, according to an embodiment. Specifically, FIG. 4 shows in more detail the classifying of condition numbers as discussed in step 102 of FIG. 1.

As illustrated in step 401, the machine precision of a computer, which is the smallest numerical value that can distinguish two numerical values, is used. The machine precision provides a value associated with the minimum amount of round off error associated with the finite precision of the computer. A computer's precision can be derived from the number of bits allocated for the mantissa in the computer's floating point implementation, or calculated programmatically if the implementation is unknown. For example, machine precision for double precision numerical values is about 1e–16 for commonly used computers using Intel chips, such as the Xeon, or Advanced Micro Devices chips, such as the Opteron.

Scientific computing applications operating on finite precision computers frequently need to use one or more tolerances to distinguish significant values from ones arising from round off error. These tolerances influence the decisions made by the application. Ill conditioning will be problematic if it creates round off error exceeding the application tolerances, as the application algorithm will then make decisions based on round off error. This can lead to the big changes in output associated with small changes in input that define ill conditioning. Therefore, by using the condition number, the machine precision, and the tolerances used by the computing application, one can design a method to assess whether the minimal change in input associated with the machine precision can alter algorithmic decisions, leading to big differences in the computed solution. In other words, one can design a quantitative method to assess whether a square linear system of equations is ill conditioned. This extends the state of the art beyond the qualitative methods currently available.

After obtaining the machine precision of the computer in step 401, in step 402 the tolerance from an application is used to determine an acceptable solution. Specifically, a solution is deemed acceptable when the algorithm's decisions are not influenced by round off error, especially the unavoidable round off error associated with machine precision.

After obtaining the machine precision of a computer in step 401 and the tolerance of an application in step 402, a threshold condition number value t is calculated in step 403. Specifically, a threshold condition number value is determined above which round off error associated with the machine precision can exceed the algorithm tolerances used to make decisions. To do so, use the following well known inequality arising from the derivation of the condition number for the matrix A in the linear system Ax=b. In this inequality, $\Delta b$ represents the change in input, while $\Delta x$ represents the change in computed solution.

$$\|\Delta x\|/\|x\| \leq \|A\|\|A^{-1}\|\|\Delta b\|/\|b\| \quad (1)$$

From this inequality, it can be seen that if b is perturbed by the machine precision eps, the relative change in the computed solution x could be as much as $\|A\| \|A^{-1}\|$ eps. In other words, if $\|A\| \|A^{-1}\|$ eps exceeds the minimum algorithm tolerance used to make key decisions, the algorithm may make decisions based on round off error arising simply from machine precision.

Different decisions based on a small change like machine precision can lead to different results, which fits the definition of ill conditioning. Using a machine precision eps, and a tolerance tol, ill conditioning can occur when $$\|A\|\|A^{-1}\| \text{eps} \geq \text{tol} \quad (2)$$

Dividing both sides of this inequality by the positive quantity eps, a threshold condition number value t is calculated based on the following equation:

$$t = \text{tol}/\text{eps}. \quad (3)$$

For example, if an application has a default algorithmic tolerance of 1e-6 and double precision arithmetic is run on machines with a precision of approximately 1e-16, the key threshold is represented by the equation:

$$t = 1e-6/1e-16 = 1e+10 \quad (4)$$

After the threshold condition number value t is calculated, it is determined in step 404 whether a square linear system of equations is ill conditioned. Using a condition number, identified as kappa, which was calculated during the sampling in step 101 of FIG. 1, if kappa is greater than or equal to t (kappa>=t), then in step 405, this is an indication that the condition number can create round off error that exceeds the tolerance used to make decisions about the feasibility of a solution. This indicates ill conditioning. Specifically, this threshold value t would indicate the value above which the condition number is large. Therefore, the implementation of the algorithm can make decisions based purely on the round off error. The definition of ill conditioning is met since a small change to the model or associated algorithm can lead to a big change in the computed solution. Further, such decisions can lead to inconsistent or unexpected results.

If kappa is less than t (kappa<t), then in step 406, round off error associated with machine precision in the computed solution of the square linear system cannot exceed tot, which indicates that the square linear system is not ill conditioned. Specifically, this would indicate that the value of the condition number is small. Since the derived value of kappa provides an upper bound rather than an exact value of the effect of ill conditioning, the level of ill conditioning can be further classified.

Further, with respect to classifying step 102, after the value of the condition number is determined to be large or small, the condition number can be further classified to more particularly identify the degree of the ill conditioning.

The condition numbers can be further classified into four different categories in step 407 and step 408. The four categories of classification could include "stable," "suspicious," "unstable," and "ill-posed." A "stable" classification, for example, could be considered a best state in which there is no indication of the linear systems of equations being ill conditioned. A "suspicious" classification could be a second best state in which ill conditioning is not likely to exist, but some possibility of ill conditioning remains. An "unstable" classification indicates that there is a significant potential for ill conditioning. An "ill-posed" classification involves condition numbers in which ill conditioning is likely to affect calculated solutions. Although four categories are described, the invention is not limited thereto and other categories as required by the user can be created. Therefore, after the condition number is determined to be ill conditioned in step 405, it can then be determined in step 407 whether the condition number is unstable or ill posed. After the condition number is determined to not be ill conditioned in step 406, it can then be determined in step 408 whether the condition number is stable or suspicious.

Figure 5:
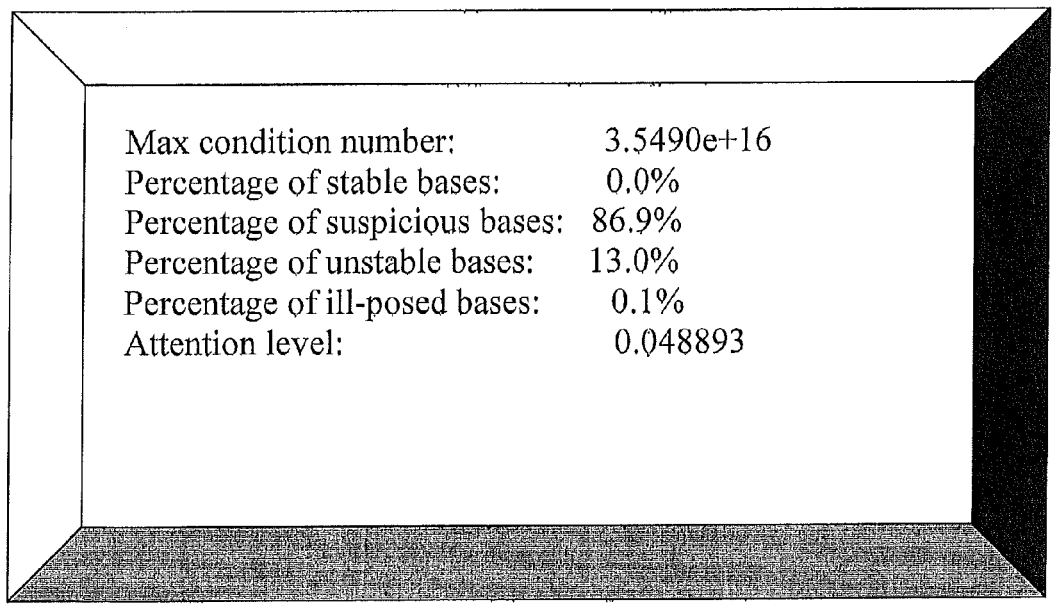
FIG. 5 illustrates the classification of condition numbers in different categories and statistic information as provided to a user, according to an embodiment.

Referring to FIG. 1, after classifying the condition numbers into categories in step 102, in step 103, statistics are calculated and provided to a user. FIG. 5 illustrates the classification of condition numbers in different categories and statistical information as provided to a user, according to an embodiment. In step 103, a percentage of each sampled condition numbers for the four categories are displayed. A user of the application can then more accurately assess the potential of whether ill conditioning would affect their computed solutions thereby saving time during model development and the implementation process. FIG. 5 also illustrates an "attention level" which would inform a user what level of attention should give to the situation.

Referring to FIG. 1, after the sampling in step 101, the classifying in step 102 and the statistics analysis in step 103, in step 104, assessment with respect to the likelihood of ill conditioning is performed.

A histogram is provided to the user with the percentages of sampled linear systems that fall into each of the four categories. The histogram can also display a warning that the model may need attention if more than a predetermined percentage of the linear systems are ill-posed. For example, with IBM ILOG CPLEX, if more than 3% of the linear systems are classified as ill-posed, or more than 10% of the linear systems are classified as unstable or ill posed, a warning could be provided to the user informing the user that the model may require attention. The warning system would therefore assist a user in determining whether their square linear systems of equations are ill conditioned. This would also assist users who are unfamiliar with ill conditioning. In an embodiment, the warning system could be combined with documentation identifying possible remedies to address the ill conditioning.

FIG. 6 is a block diagram illustrating classification information of a program according to an embodiment. As shown in FIG. 6, an embodiment is applied to CPLEX implementing a mixed integer program (MIP) embodied on a computer/server system 600. The CPLEX program as illustrated in FIG. 6 is implemented on a finite precision computer 602, but is not limited thereto.

The system 600 includes a computer/server platform 602 including a processor 603 and memory 606 which operate to execute instructions, and are coupled with a bus 604. The term "computer-readable medium" as used herein refers to any medium that participates in providing instructions to processor 603 for execution. Additionally, the computer platform 602 receives input from a plurality of input devices 601, such as a keyboard, mouse, touch device or verbal command. The computer platform may further be connected to a network 607, such as a local, public or private network. The computer interacts with a display 605 to output data and other information to a user, as well as to request additional instructions and input from the user. The display 605 may therefore further act as an input device 601 for interacting with a user.

CPLEX has a default tolerance of 1e–6 used to assess whether the solutions computed for the optimization problems it solves are feasible or optimal, respectively. A standard machine has a precision of 1e–16. Therefore, if the default tolerance of 1e–6 for feasibility and optimality is combined with the machine precision of 1e–16, the following classification values for the kappa calculated from the statistics are obtained:

Stable: kappa<1e+7
Suspicious: 1e+7<=kappa<1e+10
Unstable: 1e+10<=kappa<1e+14
Ill posed: 1e+14<=kappa In an embodiment, the classification is performed with a series of condition numbers for a series of square linear systems of equations. However, an embodiment is not limited to a series of condition numbers, and classification can be performed with a single condition number. For example, if assessing ill conditioning for a single linear system of equations, the sampling and statistical analysis need not be performed.

Therefore, in an embodiment, a quantitative measure of the magnitude of a large condition number can be determined, thereby assisting a user with respect to ill conditioning of linear systems of equations.

Although an embodiment is shown with respect to the CPLEX system, the invention is not limited to CPLEX. The embodiments can be embodied on any analytical system, such as Statistical Package for the Social Sciences (SPSS), also from IBM.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Although a few embodiments have been shown and described, it will be appreciated by those skilled in the art that changes may be made in these various embodiments without departing from the principles and spirit of the inventive concept, the scope of which is defined in the appended claims and their equivalents.

What is claimed is:

1. A method for determining ill conditioning in square linear systems of equations, the method comprising:
    sampling, by a processor, a plurality of condition numbers in the square linear systems of equations;
    classifying the condition numbers sampled from the square linear systems of equations in different categories;
    generating statistics information on the square linear systems of equations for each of the different categories of the classifying; and
    displaying the statistics information and the different categories according to classification of each of the plurality of condition numbers on a display and, depending on a value of the statistics information, displaying notification that the square linear systems of equations are ill conditioned.

2. The method according to claim 1, further comprising: assessing a likelihood of ill conditioning according to the generated statistics information.

3. The method according to claim 1, wherein the classifying the condition numbers comprises:
    obtaining a machine precision value of a computer;
    obtaining a tolerance value of an application operating on the computer; and
    calculating a threshold value which distinguishes large and small condition numbers according to the machine precision value of the computer and the tolerance value of an application.

4. The method according to claim 1, wherein the different categories are determined according to a level of ill conditioning.

5. The method according to claim 4, wherein the level of ill conditioning comprises one of a stable category, a suspicious category, an unstable category and an ill-posed category.

6. The method according to claim 3, wherein if the condition number is greater than or equal to the threshold value, the square linear system is identified as ill conditioned.

7. The method according to claim 3, wherein if the condition number is less than the threshold value, the square linear system is identified as unlikely to be ill conditioned.

8. The method according to claim 1, wherein the sampling is obtained for a predetermined amount of condition numbers.

9. A non-transitory computer readable medium storing instructions for determining ill conditioning in linear systems of equations, the instructions comprising:
    sampling a plurality of condition numbers in the square linear systems of equations;
    classifying the condition numbers sampled from the square linear systems of equations in different categories;
    generating statistics information on the square linear systems of equations for each of the different categories of the classifying; and
    displaying the statistics information and the different categories according to classification of each of the plurality of condition numbers on a display and, depending on a value of the statistics information, displaying notification that the square linear systems of equations are ill conditioned.

10. The computer readable medium according to claim 9, wherein the classifying the condition numbers comprises:
    obtaining a machine precision value of a computer;
    obtaining a tolerance value of an application operating on the computer; and
    calculating a threshold value which distinguishes large and small condition numbers according to the machine precision value of the computer and the tolerance value of an application.

11. The computer readable medium according to claim 9, wherein the different categories are determined according to a level of ill conditioning.

12. The computer readable medium according to claim 11, wherein the level of ill conditioning comprises one of a stable category, a suspicious category, an unstable category and an ill-posed category.

13. The computer readable medium according to claim 10, wherein if the condition number is greater than or equal to the threshold value, the square linear system from which the condition number was computed is identified as ill conditioned.

14. The computer readable medium according to claim 10, wherein if the condition number is less than the threshold value, the square linear system from which the condition number was computed is identified as unlikely to be ill conditioned.

15. The computer readable medium according to claim 9, wherein the sampling is obtained for a predetermined amount of condition numbers.

16. A system for determining ill conditioning in linear systems of equations, the system comprising:
    a processor with a memory,
    a sampling unit which samples a plurality of condition numbers in the square linear systems of equation;
    a classifying unit which classifies the condition numbers sampled from the square linear systems of equations in different categories;
    a statistical analysis unit which generates statistics information on the square linear systems of equations for each of the different categories of the classifying in the classifying unit; and
    a display which displays the statistics information and the different categories according to classification of each of the plurality of condition numbers and, depending on a value of the statistics information, displays notification that the squares linear systems of equations are ill conditioned.

17. The system according to claim 16, further comprising: an assessment unit which assesses a likelihood of ill conditioning according to the generated statistics information.

18. The system according to claim 16, wherein the classifying unit classifies the condition numbers by:
    obtaining a machine precision value of a computer;
    obtaining a tolerance value of an application operating on the computer; and
    calculating a threshold value which distinguishes large and small condition numbers according to the machine precision value of the computer and the tolerance value of an application.

19. The system according to claim 16, wherein the different categories are determined according to a level of ill conditioning.

20. A method for determining ill conditioning in a plurality of linear systems of equations, the method comprising:
- sampling, by processor, a plurality of condition numbers in the plurality of the square linear systems of equations;
- classifying the condition numbers sampled from the plurality of square linear systems of equations in different categories;
- generating statistics information on each of the plurality of square linear systems of equations for each of the different categories of the classifying;
- assessing a likelihood of ill conditioning according to the generated statistics information; and
- displaying the statistics information and the different categories according to classification of each of the plurality of condition numbers on a display and, depending on a value of the statistics information, displaying notification that the square linear systems of equations are ill conditioned.

21. A method for determining ill conditioning in a square linear system of equations, the method comprising:
- obtaining, by a processor, a plurality of condition numbers of the square linear system of equations;
- assessing whether the square linear system is ill conditioned according to each of different categories of the condition numbers;
- generating statistics information on the square linear systems of equations for the each of the different categories; and
- displaying the statistics information and the different categories according to classification of each of a plurality of the condition numbers on a display and, depending on a value of the statistics information, displaying notification that the square linear systems of equations are ill conditioned.

22. The method according to claim 21, wherein the different categories comprise one of a stable category, a suspicious category, an unstable category, and an ill-posed category.

* * * * *